United States Patent
De Luca et al.

(10) Patent No.: US 7,969,968 B2
(45) Date of Patent: Jun. 28, 2011

(54) LAWFUL INTERCEPTION IN WIRELINE BROADBAND NETWORKS

(75) Inventors: Enrico De Luca, Caserta (IT); Bengt Larsson, Genoa (IT); Ezio Zerbini, Genoa (IT)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 182 days.

(21) Appl. No.: 12/444,073

(22) PCT Filed: Jul. 27, 2007

(86) PCT No.: PCT/EP2007/057787
§ 371 (c)(1),
(2), (4) Date: Apr. 2, 2009

(87) PCT Pub. No.: WO2008/040583
PCT Pub. Date: Apr. 10, 2008

(65) Prior Publication Data
US 2010/0086119 A1    Apr. 8, 2010

(30) Foreign Application Priority Data
Oct. 2, 2006   (IT) .............................. MI2006A1886

(51) Int. Cl.
*H04L 12/66*     (2006.01)
(52) U.S. Cl. .................... 370/352; 370/401; 370/468
(58) Field of Classification Search ............... None
See application file for complete search history.

(56) References Cited

U.S. PATENT DOCUMENTS

| 7,769,875 | B1 * | 8/2010 | Moisand et al. | 709/229 |
| 2002/0078384 | A1 * | 6/2002 | Hippelainen | 713/201 |
| 2006/0264200 | A1 * | 11/2006 | Laiho et al. | 455/410 |
| 2010/0039946 | A1 * | 2/2010 | Imbimbo et al. | 370/252 |

FOREIGN PATENT DOCUMENTS

| EP | 1484892 A | 12/2004 |
| WO | WO 01/33822 A | 5/2001 |
| WO | WO2004/091250 A | 10/2004 |
| WO | WO 2005/069663 A | 7/2005 |

OTHER PUBLICATIONS

"Digital Broadband Cable Access to the Public Telecommunications Network; IP Multimedia Time Critical Services; Part 20: Lawful Interception; Sub-part 1: CMS based Voice Telephone Services; ETSI TS 101 909-20-2" ETSI Standards, European Telecommunications Standards Institute, Sophia-Antipo, Fr. vol. AT-Digital, No. V112, Oct. 2005—XP014032298 ISN: 0000-0001 pp. 12-31.

(Continued)

*Primary Examiner* — Duc C Ho

(57) ABSTRACT

Systems and methods are provided for lawful interception of data transmissions through at least one broadband network. Data transmissions, including voice and data services as well as high bandwidth transmissions such as multimedia and video, are intercepted and routed to authorized agencies such as law enforcement monitoring facilities. The systems and methods also enable interception of data transmissions such as peer to peer type data transmissions that pass through broadband networks from source to recipient without passing through centralized core network elements. These transmissions are intercepted at access points distributed throughout the broadband networks and forwarded to lawful intercept node elements for transmission to authorized entities.

38 Claims, 7 Drawing Sheets

OTHER PUBLICATIONS

"Digital Broadband Cable Access to the Public Telecommunications Network; IP Multimedia Time Critical Services; Part 20: Lawful Interception: Sub-part 2: Streamed multimedia services; ETSI TS 101 909-20-2" ETSI Standards, European Telecommunications Standards Institute, Sophia-Antipo, Fr. vol. AT-Digital, No. V121, Mar. 2006—XP014033869 ISN: 0000-0001 pp. 23-39.

"Digital Broadband Cable Access to the Public Telecommunications Network; IP Multimedia Time Critical Services; Part 20: Lawful Interception: Sub-part 2: Services not related to E.165 Telephony; ETSI TS 101 909-20-2" ETSI Standards, European Telecommunications Standards Institute, Sophia-Antipo, Fr. vol. AT-Digital, Aug. 2004—XP014034898; pp. 20-34.

* cited by examiner

LAWFUL INTERCEPTION IN WIRELINE BROADBAND NETWORKS

TECHNICAL FIELD

The present invention relates generally to lawful interception of electronic communications in a network. More specifically, the present invention relates to lawful interception of electronic communications that pass to or from a target in a broadband network, including peer-to-peer traffic that does not pass through any network elements located in a core network.

BACKGROUND ART

Lawful interception of data traffic, such as telephone calls that travel through a communications network, occurs for law enforcement purposes such as crime prevention, surveillance, public safety, or evidence gathering. Communications networks normally include a centralized core network, implementing a control layer, associated with non-core networks such as access and aggregation networks, which provide connectivity between end users as well as between end users and the core network. Examples of the latter are broadband networks, which are located between the core network and the end users.

Lawful interception equipment allows interception or third party monitoring of data traffic traveling through the network. To enable interception, this equipment is located in nodes in those portions of the network where the traffic actually flows. For example in the IP Multimedia Subsystem architecture, all data traffic flows through a few, well defined centralized locations, and the interception of this data traffic takes place in the elements located at these locations within the centralized, or core, portion of the communications network. In this case the core network includes logic elements that enable data traffic to be intercepted and routed to an authorized entity.

This centralized form of lawful traffic interception is not without its drawbacks. For example, evolving network architectures allow broadband traffic to pass between users without necessarily passing through centralized equipment associated with the core network. Because the lawful interception equipment is only located in nodes in the core network, a problem arises when data traffic partially or completely passes from a caller to a recipient without passing through these nodes located in the centralized core network. Existing interception technologies that are designed to intercept voice communications through a telephone network are located within the centralized core network elements and are bypassed by decentralized traffic transmissions such as peer to peer type transmissions that do not pass through elements responsible for interception. Traffic that flows in this manner can therefore not be intercepted.

Furthermore, as telecommunications networks evolve, new multimedia services and applications have been made available to users. Many of these services are more than standard voice communications, such as file sharing, video streaming or other types of broadband applications. Since existing interception technologies were designed for intercepting traffic such as voice communications with a limited bandwidth of approximately 64 kbps, they are not robust enough to properly intercept or transfer traffic that is transmitted not only in a less centralized manner but also in different formats that have higher bandwidths than audio signals spoken over a telephone. Furthermore, existing lawful interception systems are not scalable enough to transmit these higher bandwidths.

DISCLOSURE OF THE INVENTION

Thus, the aim of the present invention is to overcome the above mentioned problems by providing systems and methods related to intercepting data transmissions in a broadband network.

To increase efficiency, these systems and methods are capable of intercepting data transmissions within broadband networks where the data transmissions have not passed through centralized core network elements associated with the control layer or application servers on top of the control layer of a core network. Further, high bandwidth data transmissions such as video transmissions may be intercepted outside of the centralized core network elements, and transmitted to an authorized entity. This improves efficiency, lowers cost, and increases compatibility with existing telecommunications networks.

This aim and others are achieved by a method for intercepting data transmissions. The method receives a command to intercept data transmissions associated with a target, where the data transmissions are transmitted through at least one broadband network. The method identifies the target whose data transmissions are targeted for interception, and directs an intercept access point located in the broadband network through which the data transmissions pass to intercept them. At least a portion of the intercepted data transmissions are received by a delivery function element that is located in a lawful interception node. The received intercepted data transmission is then forwarded to at least one authorized entity.

The above mentioned aim and others are also achieved by a system for intercepting data transmissions. The system includes a receiver that is associated with a processor that receives a command to intercept data transmissions that are associated with a target and that are transmitted through at least one broadband network. The processor identifies a target whose data transmissions are targeted for interception, and directs an intercept access point located in the broadband network through which the data transmissions pass to intercept them. A delivery function associated with the processor and located in a lawful intercept node that is associated with a core network receives at least a portion of the intercepted data transmission, and the received intercepted transmission is transmitted from the lawful intercept node to at least one authorized entity.

In certain embodiments, the systems and methods may also identify or intercept any data transmission in a broadband network passing to or from the target, and these systems and methods may intercept, at the intercept access points located in an access network or a metro network, the data transmission during transmission through the access or metro networks. An administration function element located in the lawful intercept node may dedicate bandwidth in any network for backhauling intercepted data from the intercept access point to a delivery function. The intercepted data transmission may be replicated, with either the original or the replicated intercepted data transmission passed to the delivery function and finally to the authorized entity.

These aims and objects are achieved by the methods and systems according to independent claim 1 and any other independent claims. Further details may be found in the remaining dependent claims.

Other aspects and advantages of the embodiments disclosed herein will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

WAYS OF CARRYING OUT THE INVENTION

Figure 1:
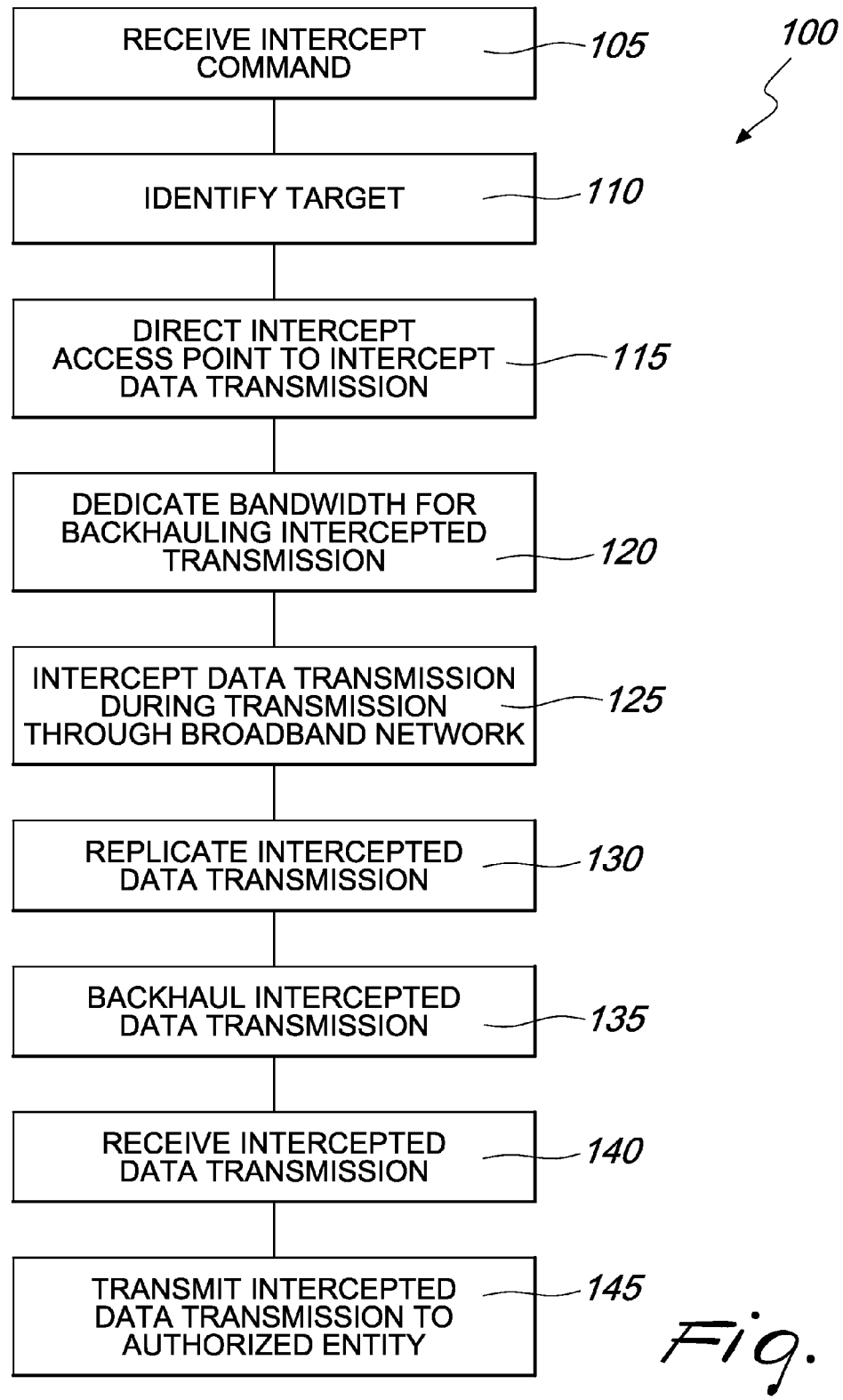
FIG. 1 is a flow chart depicting a method for interception of data transmissions in accordance with an embodiment of the invention.

As shown in the drawings for the purposes of illustration, the invention may be embodied in systems and methods for intercepting data transmissions through at least one broadband network.

These systems and methods are able to intercept data transmissions outside the core network elements located in or on top of the control layer of a core network. Embodiments of the invention allow for interception, collection, and forwarding of data transmissions, thus extending lawful intercept capabilities by enabling interception of multimedia services in a broadband environment.

In brief overview, FIG. 1 is a flow chart depicting a method 100 for interception of data transmissions in accordance with an embodiment of the invention. Method 100 includes a first step of receiving a command to intercept a data transmission associated with a target, the data transmission being transmitted through at least one broadband network (STEP 105). Receiving the intercept command (STEP 105) may include receipt of a warrant authorizing an electronic wire tap that is issued by a competent tribunal or authority. The command may authorize interception of all data transmissions to or from user equipment, such as a telephone or computer, associated with a target, such as a person whose activities are subject to governmental monitoring. The command may be received electronically, verbally, or manually. The command may also be in the form of an electronic communication received by a third party. Receiving step (STEP 105) may include reception by an administration function of a warrant from a law enforcement agency with identification of users, services, or other targets to intercept. Receiving step (STEP 105) typically includes receiving any signal or indication authorizing or ordering the interception of a data transmission that travels in any format through a network. Typically, receiving an intercept command (STEP 105) may include receiving a command to intercept all transmissions to or from a targeted user. The command may be for an open time period, or for a given period of time, such as a particular hour, day, or month. The command may also specify interception of transmission of various specified services, such as voice, video, or the like.

Method 100 next includes the step of identifying the target (STEP 110). Identification step (STEP 110) may include identifying a person whose transmissions are to be intercepted.

Identifying a target (STEP 110) typically also includes identifying where a target is located in a broadband network. This may be done for example by translating a target's name to a telephone number, electronic address or user ID associated with the target in a telecommunications network.

This information generally reveals the physical location (e.g., a specific port on a DSLAM) where an intercept access point may be activated. Identification step (STEP 110) typically identifies who a target is and where the target is located.

After receiving an intercept command (STEP 105) and identifying a target (STEP 110), method 100 typically includes directing an intercept access point to intercept data transmissions (STEP 115) to or from the target. In an embodiment, each intercept access point may be located in at least one of the broadband networks. Typically, one or more processors control or direct the interception of data transmissions at any of a plurality of intercept access points. These processors may be located at or remote from the intercept access points. Directing the intercept access points to intercept a data transmission (STEP 115) may include sending an electronic signal to one or more intercept access points so that a data transmission to or from the target is intercepted at any intercept access point located in a broadband network. For example, an intercept access point may receive instructions from an administration function that provides the intercept access point with various target data, such as any user data, user identification, or a service type that is to be intercepted.

Continuing with this example, the administration function may directly activate one or more intercept access points that are located in broadband network, elements to filter various transmissions to find a specific target. The electronic signal may be sent through any core or broadband network, and may be sent through more than one network.

In various embodiments, method 100 may include the step of dedicating bandwidth (STEP 120) for backhauling at least a portion of the intercepted data transmission from any intercept access point to the delivery function or other centralized destination. As stated previously, the systems and methods disclosed herein may, in some embodiments, intercept data transmissions that require a bandwidth higher than the bandwidth used for audio transmissions, such as voice telephone calls, or compressed or uncompressed voice over Internet protocol (VoIP) calls. Dedicating bandwidth for the intercepted data (STEP 120) generally ensures that the intercepted transmission can be routed to its proper destination. Dedicating bandwidth (STEP 120) generally includes reserving a sufficient amount of bandwidth so that an intercepted data transmission may be transmitted to its destination. When present, dedicating bandwidth (STEP 120) for backhauling intercepted data from, for example, an intercept access point to a delivery function in a centralized node such as a lawful intercept node, may take place before any data is actually intercepted.

Method 100 may also include the step of intercepting the data transmission (STEP 125).

Intercepting step (STEP 125) generally occurs at one or more intercept access points during transmission through one or more broadband networks. Generally, intercepting step (STEP 125) occurs when an intercept access point that is located in a broadband network element discovers traffic such as a data communication to or from a user whose communications are targeted for interception. In this example, this traffic is filtered out for interception. The data transmission may be intercepted (STEP 125) during transmission through one or more broadband networks, such as through an access network, a metro network, a local area network, a wide area network, or a network with broadband capability. In an embodiment, these broadband networks may be separated from a core network and core network elements associated with the control layer of the core network, by at least one access edge node. In this illustrative embodiment, the access edge nodes may provide all or a portion of the interface between any broadband networks, such as access or metro networks, and the core network. Generally, the access edge nodes may be considered conceptually to be between the intercept access points where the data transmission was intercepted and the centralized core network elements operating at or above the control layer of the core network.

Interception step (STEP 125) may also include identifying a data transmission, such as a video call, made to or from the target prior to its interception. Interception step (STEP 125) may include identifying or detecting a data transmission of the type whose interception is authorized in the command authorizing interception. This may include identifying a data transmission as originating from, or being directed to, any particular piece of user equipment associated with a target whose transmissions are identified for interception. Identifying the data transmission as a transmission whose interception has been authorized for interception and received may include monitoring user equipment for incoming or outgoing communication. Detection of this type of communication may then be sufficient identification to identify a data transmission targeted for interception.

In various embodiments method 100 may include replicating at least a portion of the intercepted data transmission (STEP 130). Replicating (STEP 130) generally includes making an electronic copy of the intercepted data transmission. This copy may be identical to or indistinguishable from the original data transmission. As referred to herein, in various embodiments, any references to any portion of the intercepted data transmission may also include or be substituted with a replication or copy of the intercepted data transmission. In other words in some embodiments, one or more copies of any portion of the intercepted data transmission may be transmitted, received, or otherwise processed.

In some embodiments method 100 may proceed with the step of backhauling at least a portion of the intercepted data transmission or replica thereof (STEP 135). It is not always necessary to dedicate bandwidth specifically for backhauling an intercepted data transmission (STEP 120). Backhauling step (STEP 135) may also occur in the absence of any special dedication of bandwidth (STEP 120) for backhauling. Backhauling intercepted data (STEP 135) may include the transmission of intercepted data from an intercept access point located in a broadband network to a delivery function located in a lawful intercept node of a core network. Generally, backhauling involves transporting traffic between distributed sites, such as intercept access points located in a broadband network, and more centralized locations, such as a delivery function associated with a lawful intercept node. It follows that backhauling the intercepted data transmission (STEP 135) typically includes transmitting the intercepted data transmission from any intercept access point to the delivery function.

Continuing, method 100 may include receiving at least a portion of the intercepted data transmission (STEP 140). In various embodiments, all or part of the intercepted data transmission may be received (STEP 140) at a delivery function that is located in a lawful intercept node for example in the core network. In an illustrative embodiment, the intercepted data transmission may be received (STEP 140) from distributed broadband networks, such as access or metro networks, that are outside the core network elements and outside or below the control layer of the core network. Continuing with this illustrative embodiment, the point at which the intercepted data transmission is received, for example by the delivery function, may be located in a lawful intercept node of the core network. In a typical embodiment a delivery function receives a replica of the intercepted data from an intercept access point.

Once at least some of the intercepted data transmission has been received (STEP 140), for example at a delivery function, method 100 may then include transmitting at least a portion of the intercepted data transmission to at least one authorized entity (STEP 145). This transmission (STEP 145) may take place from elements associated with the lawful intercept node of the core network, such as one or more of the delivery function, administration function, or mediation function. At least a portion of the intercepted data transmission may be transmitted (STEP 145) to at least one authorized entity, such as a law enforcement monitoring facility, for example. In a general embodiment, the intercepted data transmission may be transmitted from a mediation function of a lawful intercept node in a core network over various handover interfaces to one or more authorized entities, such as law enforcement monitoring facilities.

Figure 2:
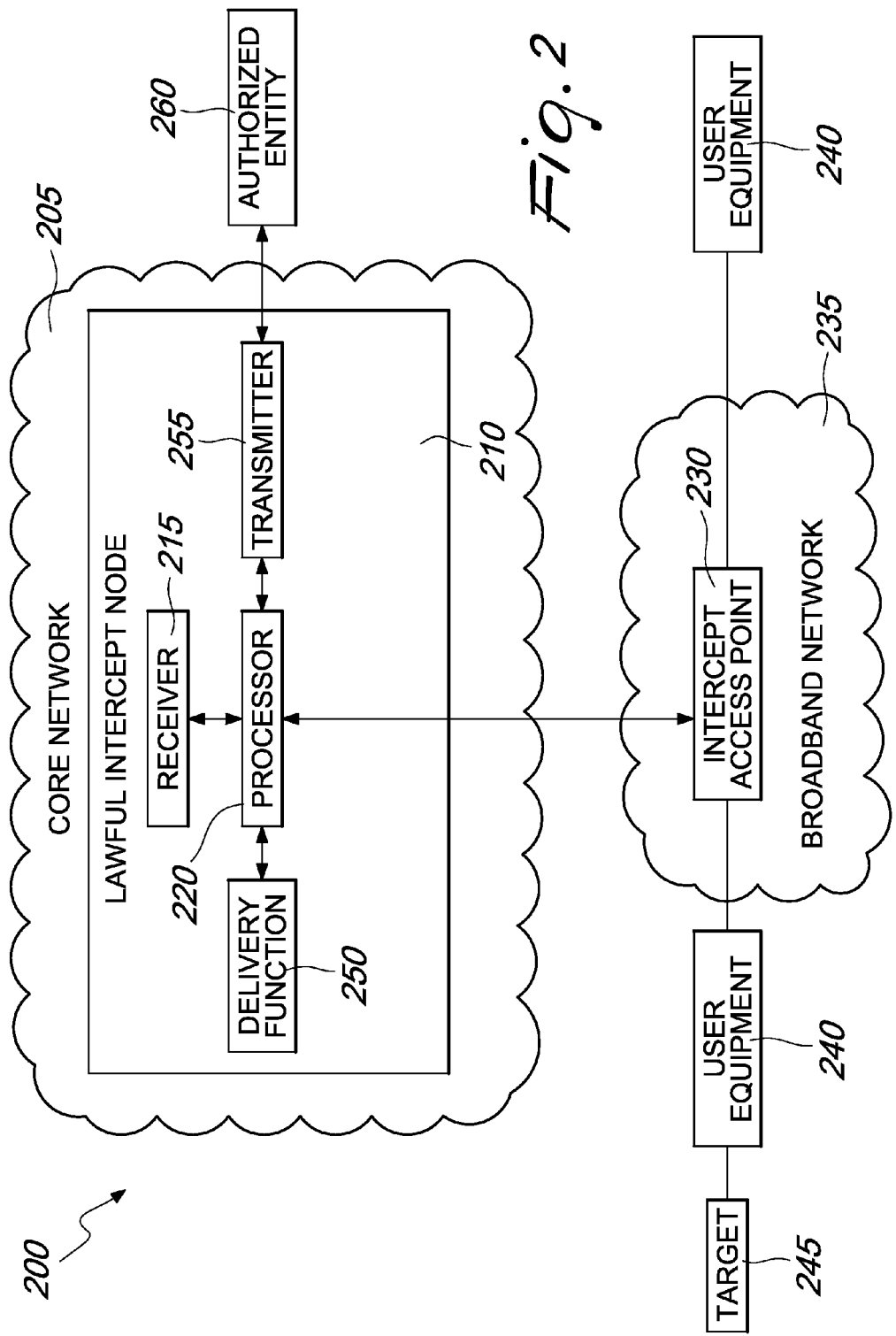
FIG. 2 is a block diagram depicting a system for interception of data transmissions in accordance with an embodiment of the invention.

In brief overview, FIG. 2 is a block diagram depicting a system for interception of data transmissions in accordance with an embodiment of the invention. System 200 generally includes a core network 205. Core network 205 may include any telecommunications network through which data transmissions are passed. Generally, core network 205 may include any of a fixed network, a mobile network, or a convergent fixed and mobile core network. In general, core network 205 may support circuit switched or packet switched traffic. Depending on the usage, core network 205 may be implemented in compliance with some international standards, for example the Third Generation Partnership Project or the European Telecommunications Standard Institute standards.

Core network 205 generally includes a plurality of nodes located in or above the control layer (which may also be referred to as the service control layer) of the network, for example any of a Local Exchange, a Mobile Switching Center (MSC), a Mobile Switching Center Server (MSC-S), a Media Gateway, or a Call Session Control Function (CSCF).

Generally the core network 205 will also host one or a plurality of lawful intercept nodes 210 used for lawful interception purposes. In various embodiments lawful intercept nodes 210 may be located either within core network 205 or in another network such as a broadband network.

Lawful intercept nodes 210 may be centralized nodes that include logic elements such as receiver 215, processor 220, delivery function 250, and transmitter 255. System 200 generally includes receiver 215 associated with processor 220 for receiving a command to intercept a data transmission associated with a target, where the data transmission is transmitted through at least one network.

Generally, receiver 215 is a device capable of receiving or accepting incoming signals, data, or commands. Receiver 215 may be a component of a computer or other device used to implement system 200. Alternately, receiver 215 may be a stand alone device capable of both receiving and transmitting commands or data. Generally, receiver 215 may receive a command to intercept any data transmission including any associated Intercept Related Information or Contents of Communication to or from any device such as any user equipment that is capable of associating with and sending data transmissions through a network. Receiver 215 may receive a command directly entered into receiver 215 by, for example, a human operator.

In various embodiments a human operator may input into receiver 215 a command to intercept a transmission such as an audio, video, or other data message to or from any type of user equipment. The command may, for example, stem from a search warrant issued by a government or authorized institution authorizing interception of a data transmission. In various embodiments, this command may be communicated directly from the authorized institution to receiver 215. In alternate embodiments, the command may be communicated by an intermediary, such as a human operator who receives the command from an authorized source, and then inputs the command to system 200 via receiver 215 or a graphical user interface.

System 200 may also include at least one processor 220. Generally, processor 220 is any logic device capable of data manipulation, such as a microprocessor chip capable of data processing, with sufficient processing power to perform the operations described herein. In various embodiments processor 220 may be included as a central processing unit of a computer. Processor 220 is generally capable of a data transmission and determining if that data transmission is subject to interception based on the received command. For example, this may be done by identifying a telephone number, IP address, account number or other identifying characteristic that indicates that a data transmission is to be intercepted.

Processor 220 generally receives as input from receiver 215 the command to intercept a data transmission and is capable of processing information to detect data transmissions to or from any user equipment through a network. For example, processor 220 may directly or indirectly communicate with any network element in any network to determine the existence of a data transmission through that network, or to identify the location of a target within a broadband network. Processor 220 may also determine if a detected data transmission is a data transmission that is to be intercepted, based on the command received by receiver 215. In certain embodiments, this determination may be made, for example, with the assistance of a Home Location Register (HLR), Visitor Location Register (VLR), or other components associated with a network such as, for example, a telephone network.

Processor 220 in conjunction with intercept access point 230 may intercept or direct the interception of a data transmission that travels through a network such as a broadband network.

Processor 220 may interact with or be located in one or more networks, such as for example core network 205 or broadband network 235, to intercept a data transmission as it is transmitted through the broadband network 235. Contents of Communication (i.e., the actual data transmission), Intercept Related Information (i.e., associated information such as an indication of the point of origin of a data transmission), or any other data that is associated with all or part of the data transmission may also be intercepted at intercept access point 230 located in broadband network 235. Processor 220 may include an administration function or any logic devices capable of connecting with a plurality of networks to facilitate, direct, or authorize the interception of the data transmission at intercept access point 230. Intercept access point 230 is generally capable of intercepting any signal in any format including audio, video, streaming, or picture files compatible with core network 205 or any broadband network 235 such as an access or metro network. As a non-limiting example, the intercepted data may include coded human speech, a text message, video files, audio files, images, a date of transmission, a time of transmission, a location of transmission, or data identifying a source or intended recipient of the transmission, or any combination thereof.

Processor 220 generally directs interception of a data transmission at an intercept access point 230 as the data transmission passes through one or more broadband networks 235. For example, a data transmission such as a video file may be routed through a portion of broadband network 235 where it is susceptible to lawful interception. Interception of this portion of broadband network 235, such as a node where the data transmission is susceptible to interception is known as intercept access point 230. Intercept access point 230 generally includes or receives and processes logic for identifying a target, identifying a transmission to or from that target, receiving and processing instructions to intercept a data transmission, intercepting the data transmission and any associated data, and forwarding that data to lawful intercept node 210 or other core network 205 element. Generally intercept access point 230 includes the location where the lawful intercept node 210 interacts with broadband network 235 to intercept the data transmission. In some embodiments, intercept access point 230 may interface with one or more access edge nodes (not shown) to communicate with processor 220, or other elements of lawful intercept node 210 or core network 205.

System 200 may include or associate with one or more broadband networks 235. Broadband network 235 may include access, aggregation, or metro networks for wireline broadband.

Broadband network 235 may include, for example, an access network, metro network, local area network, or wide area network. Broadband networks 235 may, in some embodiments, have core capability or may themselves be core networks. In some embodiments data transmissions may pass between a plurality of broadband networks during transmission from source to destination without passing through any elements of a core network 205. These peer to peer type data transmissions may, in other words, be sent by one device associated with one broadband network 235 and received by another device associated with the same or a different broadband network 235 directly, that is, without passing through any core elements (which may collectively be referred to as a core network) located at the control layer of core network 205.

Broadband networks 235 are generally a part of a communications network or networks that connect targets 245 or other subscribers or users to their immediate service provider. In various embodiments broadband networks 235 may use wireless infrastructure such as microwave or radio, or optical fiber connections. Broadband networks 235 may include point-to-point or packet switched networks, and may, in some embodiments, include protocols that operate at data link layer two of the seven layer Open Systems Interconnection (OSI)

model. Conceptually broadband networks 235 such as access networks may be considered to be at the edge of the overall communications network, located closest to a target 245, (i.e. user or subscriber,) such as a person transmitting video over a computer or mobile telephone. A target or subscriber may interface with user equipment 240 to send or receive data transmissions through broadband network 235. Access networks may connect to user equipment 240 associated with targets 245 by use of one or more access nodes (not shown). These access nodes may, for example, include Internet Protocol Digital Subscriber Line Access Multiplexers (IP DSLAM) or Internet Protocol Multi Service Access Nodes (IP MSAN), or and Ethernet Node in the case of, for example, fiber based access networks. Metro networks, which may be included within broadband networks 235, are generally used for aggregating traffic such as data transmissions from access nodes and transporting it toward access edge nodes that are located at the boundary between the core elements of core network 205 and broadband network 235.

User equipment 240 generally includes any device capable of transmitting or receiving data through a network. User equipment 240 may include any mobile or fixed telephones, personal display assistants, computers, or other similar devices capable of transmitting or receiving data. A target 245, such as a user whose incoming and/or outgoing data transmission are under an intercept order, interfaces with user equipment 240 to send or receive data transmissions that may be intercepted at intercept access point 230 during transmission to or from another piece of user equipment 240.

Generally, once a data transmission has been intercepted at intercept access point 230, it is forwarded to at least one delivery function 250. Delivery function 250 is typically located in lawful intercept node 210, which is generally hosted in the core network 205. Delivery function 250 may be associated with or integral to any of processor 220, receiver 215, or transmitter 255. Delivery function 250 may operate at or above the control layer of core network 205. Delivery function 250 is generally capable of receiving at least portions of intercepted data transmissions that were intercepted at any number of intercept access points 230. These intercepted data transmissions are generally forwarded from intercept access points 230 to delivery function 250. In various embodiments, one or more access edge nodes (not shown) may interface between the core elements of core network 205 and broadband network 235 (where intercept access point 230 is generally located) to assist in the forwarding of the intercepted data transmission to delivery functions 250. Delivery functions 250 typically receive all or part of the intercepted data transmission, such as any Intercept Related Information (IRI) or Contents or Communication (CC) from intercept access point 230 or its associated components and forwards them on, where they are finally received by one or more authorized entity 260. In some embodiments, delivery functions 250 may prevent multiple authorized entities 260 from becoming aware of each others' existence.

An intercepted data transmission, received by delivery function 250, is generally transmitted by at least one transmitter 255 to at least one authorized entity 260. Typically, transmitter 255 sends or transmits the data transmission to authorized entity 260. In certain embodiments, transmitter 255 may transmit Contents of Communication, such as the actual audio or video file, or other Intercept Related Information, such as the identity of user equipment 240 associated with the origin or destination of the data transmission, or with a user (e.g. target 245) whose communications have been authorized for interception. Transmitter 255 generally is capable of transmitting the intercepted data transmission in any manner. This may include electronic, wired, or wireless transmission, as well as transmitting a coded transmission. Transmitter 255 may access core network 205 or broadband network 235 to transmit the intercepted data transmission in any medium, including a medium different from the original transmission medium. In certain embodiments, transmitter 255 is capable of transmitting audio, picture, or video signals. In an alternate embodiment, transmitter 255 may include a printer for printing the contents of the intercepted transmission, where the printed contents are then transmitted to authorized entity 260.

In various embodiments transmitter 255 may include a separate device for transmitting. In other embodiments, transmitter 255 may be included in the same device as processor 220, receiver 215, or delivery function 250 or any other element of lawful intercept node 210. Transmitter 255 may include one or more mediation functions that transmit intercepted data transmissions over one or more interfaces, such as handover interfaces, to their intended destination. In some embodiments, any combination of receiver 215, processor 220, delivery function 250, transmitter 255, or other lawful intercept node 210 elements may be included in a single device, such as a computer. Transmitter 255 is generally capable of transmitting any signal in any format including audio, video, or picture files such as coded human speech, a text message, a date of transmission, a time of transmission, a location of transmission, or data identifying a source or intended recipient of the transmission.

By way of example, in an illustrative embodiment, receiver 215 receives a command to intercept all data transmissions originating from or directed toward user equipment 240 associated with a target 245. Processor 220 may identify target 245 and may detect a data transmission, such as target 245 sending a video file from user equipment 240 into broadband network 235, such as access or metro networks. This data transmission may be intended for a different piece of user equipment 240 associated with the same or a different broadband network 235. Processor 220 then interfaces with intercept access point 230 to intercept the data transmission. Continuing with this non-limiting example, the data transmission is intercepted at intercept access point 230, which is located in broadband network 235. Thus in this embodiment intercept access point 230 is outside core network elements of core network 205. This generally allows interception of data transmissions that are transmitted only through broadband networks 235, such as peer to peer type transmissions that do not travel through centralized equipment at or above the control layer of core network 205. The intercepted data transmission is forwarded to delivery function 250, in some embodiments with the assistance of one or more access edge nodes or other network elements. Delivery function 250 may interface with any of processor 220, receiver 215, transmitter 255, or other elements of core network 205 such as administration functions or mediation functions that generally operate at or above the control layer, to transmit at least a portion of the intercepted data communication to at least one authorized entity 260. In an embodiment, intercept access point 230 may be activated at a location in broadband network 235 where target 245 has been located. Target 245 is generally located by mapping target information, such as a target name, to an ID used on broadband network 235, such as a telephone number, email address, or username, for example. This information allows for determination of the physical location (e.g. a specific port on a DSLAM) on broadband network 235 where intercept access point 230 may be activated. This activation may direct intercept access point 230 to intercept data transmissions to or from target 245, replicate any intercepted data transmissions, and forward them to lawful intercept node 210 elements, such as delivery function 250, for example.

Further, in some embodiments, the data transmission is not interrupted during interception.

In other words neither the sender nor the recipient of the data transmission is aware of the interception. In various embodiments the data transmission may be replicated. This may occur at intercept access point 230 or within lawful intercept node 210, and either the original or the replicated intercepted data transmission may be sent to either authorized entity 260 or to the intended recipient of the data transmission.

Authorized entity 260 is generally the agency or person authorized to receive the intercepted data transmission. Generally, the authorization for authorized entity 260 to receive an intercepted transmission is granted by a government or governmental organization. In some embodiments, authorized entity 260 may be the entity that sent the initial command, received by receiver 215, to intercept a transmission. Generally, authorized entity 260 is associated with lawful intercept node 210, with transmitter 255 acting as the interface between lawful intercept node 210 and authorized entity 260.

In some embodiments, authorized entity 260 may include at least one law enforcement agency or law enforcement monitoring facility. In various embodiments, there may be more than one authorized entity 260, and in some embodiments multiple authorized entities 260 are not aware of each others' existence. Multiple authorized entities 260 may also receive different portions of the data transmission or different Intercept Related Information associated with the transmission.

Authorized entity 260 may also include a monitoring center designed to receive at least one data transmission whose contents may be monitored, typically by trained or authorized personnel.

Authorized entity 260 is generally able to receive any data associated with the data transmission. In various embodiments a stand-alone Intercept Related Information (IRI) report may be transmitted to authorized entities 260 informing them of data associated with target 245.

In certain embodiments involving communications to or from user equipment 240 over broadband network 235, Intercept Related Information (IRI, or Events) is necessary at the beginning of a data transmission, the end of a data transmission, for all supplementary services during a data transmission, and for information that is not associated with the data transmission. Events may generally include any content data related to the data transmissions (such as date, time, or location). In various embodiments, processor 220 may detect an Event indicating a data transmission, and direct intercept access point 230 to intercept the data transmission or associated data in broadband network 235. The intercepted data transmission is then forwarded through system 200 components such as delivery function 250, processor 220, and transmitter 255, or generally through any delivery, administration, or mediation functions to authorized entity 260. System 200 is generally capable of intercepting any data transmission in a Packet Switching (PS) or Circuit Switching (CS) domain.

Figure 3:
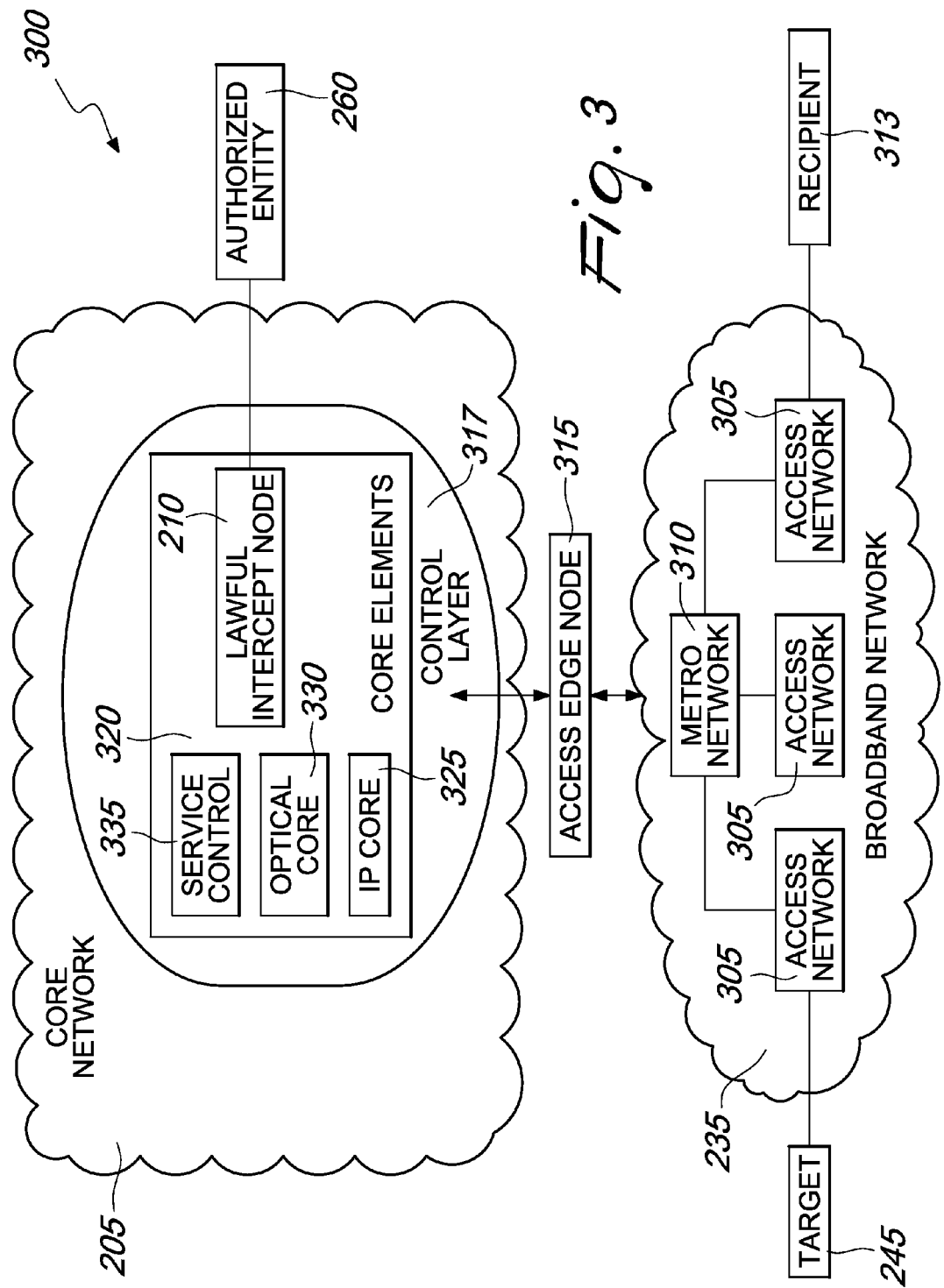
FIG. 3 is a conceptual layered diagram depicting a telecommunications network architecture system in accordance with an embodiment of the invention.

In brief overview, FIG. 3 is a conceptual layered diagram depicting telecommunications network architecture system 300 in accordance with an embodiment of the invention. Generally, packet switching telecommunications networks enable the deployment of a wide range of multimedia services. In emerging horizontally layered network models various embodiments shift services toward the edges of the overall telecommunications architecture, either to application servers on top of the control layer, or directly toward the end users 245 at the edge.

System 300 generally includes broadband network 235 and core network 205. Broadband network 235 may include a plurality of access networks 305 and metro networks 310. Access networks 305 and metro networks 310 may interface with each other as a data transmission is passed from target 245 to recipient 313. In some embodiments the roles of target 245 and recipient 313 may be reversed, so that target 245 is the one receiving the data transmission. Users 245 and recipients 313 are generally connected to access networks 305 by means of access nodes (not shown), such as an IP DSLAM, IP MSAN, or Ethernet node, as previously described. Access edge nodes 315 are generally used for authentication and authorization purposes, and can control a user's (such as target 245) access to particular services. Access edge nodes 315 generally contain a range of different functionalities for different scenarios, and may include for example Edge Routers, Broadband Remote Access Servers, and Session Border Gateways. In a typical embodiment, data transmissions that pass through the access nodes may be passed to a metro network 310, where they are aggregated and passed to access edge node 315, which may act as the interface between core network 205 and broadband network 235. In peer-to-peer type services, however, target 245 connects directly to recipient 313 over access network 305 or metro network 310, and control layer 317 is typically not involved. In other words, in this embodiment the data transmission is completely distributed into access networks 305 and metro networks 310 with no interference from centralized control layer 317. Therefore, in this scenario, intercept access points 230 are generally distributed to access networks 305, metro networks 310, or elsewhere in the broadband network 235, and not in centralized nodes, such as Local Exchanges, Mobile Switching Centers, MSC Servers, Media Gateways, or Call Session Control Function nodes in the control layer 317 of core network 205.

In various embodiments, the intercepted data transmissions are then backhauled from intercept access point 230 located in broadband network 235, such as access network 305 or metro network 310, to lawful intercept node 210 located in core network 205. System 300 may also include core elements, which generally operate at control layer 317 and include IP core elements 325, optical core elements 330, and service control elements 335, which may interface with operations that operate at the service layer above control layer 317. These core elements generally assist in the transport of intercepted data between intercept access point 230 and delivery function 250. In an embodiment, elements within control layer 317 dedicate sufficient bandwidth for transfer of the intercepted data transmission into lawful intercept node 210 prior to interception. In some embodiments lawful intercept node 210 collects and forwards the intercepted data transmission to at least one authorized entity 260.

In an illustrative embodiment, in system 300, target 245 sends a data transmission through broadband network 235 to recipient 313. Both target 245 and recipient 313 are generally users accessing broadband network 235 by means of user equipment 240 (not shown). In this illustrative embodiment, all data transmissions associated with target 245 are to be intercepted. Continuing, the data transmission, (indicated for example in FIG. 3 by the connection between target 245 and recipient 313 through broadband network 235 and any access networks 305 or metro networks 310) may be a high bandwidth data transmission such as a large video file. Furthermore, this data transmission does not pass directly through core elements 320 associated with core network 205.

Instead, in this non-limiting example, the data transmission remains on the target side of access edge node 315. The data transmission is intercepted at an intercept access point (not shown) located in broadband network 235. The intercepted data transmission, or a copy thereof may then be passed through access edge node 315 or any other interface to lawful intercept node 210, and then to authorized entity 260. In various embodiments recipient 313 may or may not receive the data transmission or a copy thereof, and recipient 313 is generally unaware that the data transmission has been intercepted.

Figure 4:
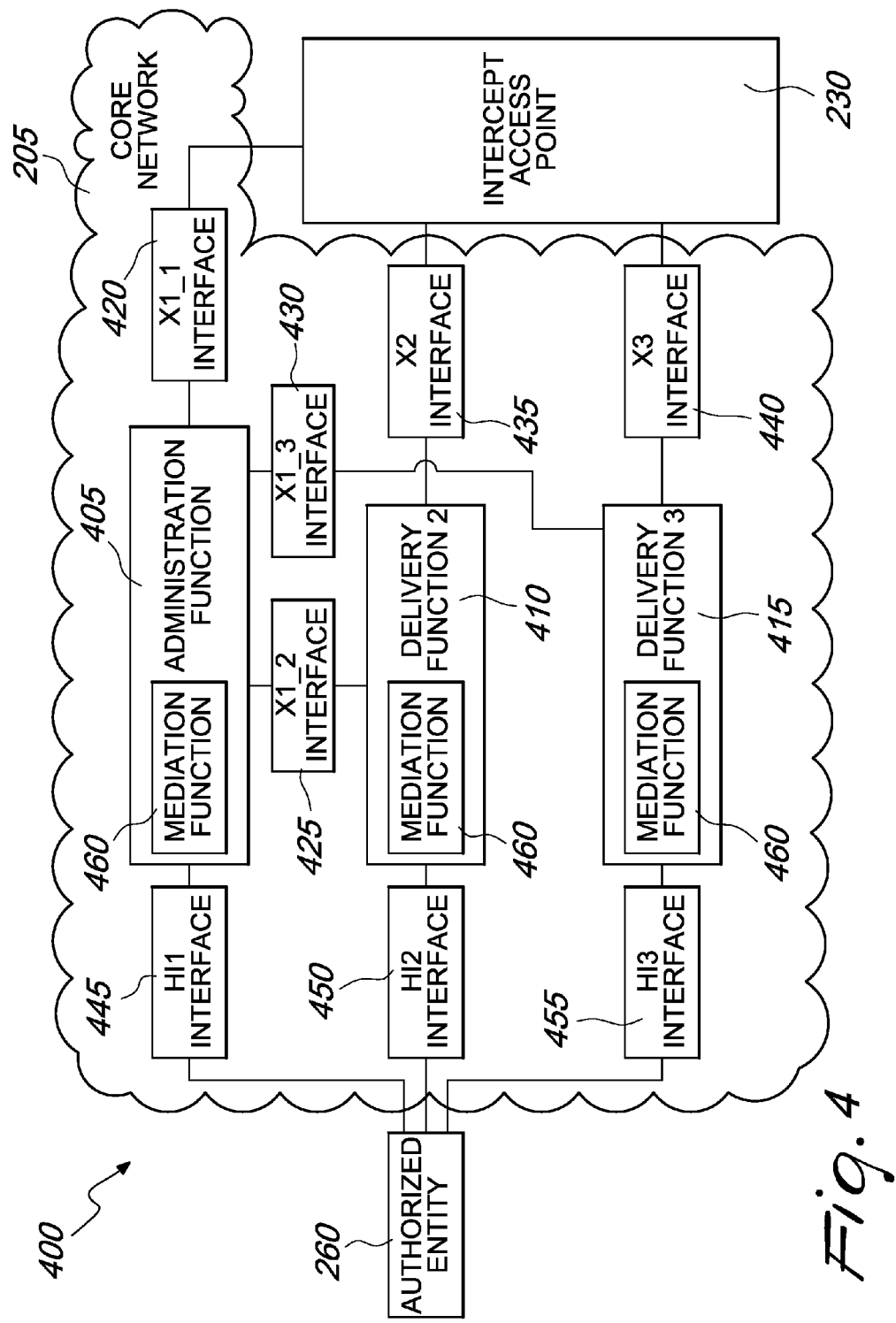
FIG. 4 is a block diagram depicting a system intercept configuration for lawful interception of transmissions in accordance with an embodiment of the invention.

In brief overview FIG. 4 is a block diagram representing a system 400 intercept configuration for lawful interception of transmissions in accordance with an embodiment of the invention. System 400 generally includes intercept access points 230, which are the points at which the data transmission is intercepted. Intercept access points 230 are typically implemented in selected nodes of a telecommunications network, such as the access 305 or metro 310 parts of broadband network 235. Intercept access points 230 generally contain functions for monitoring and intercepting data transmissions including Intercept Related Information or Call Content from a user such as target 245 who has been targeted for interception.

As can be seen in FIG. 4, core network 205 generally includes at least one Administration Function (ADMF) 405, at least one Delivery Function II (DF II) 410 and at least one Delivery Function III (DF III) 415. These elements are typically collocated in lawful intercept node 210. In various embodiments DF II 410 and DF III 415 are integral to and part of overall delivery function 250, described earlier. Administration Function 405 may interface with authorized entities 260, DF II 410, DF III 415, and intercept access point 230, as well as other elements like mediation function 460, for example. Although any suitable interface may be used, the interface between ADMF 405 and intercept access point 230 may include X1_1 interface 420. The interface between ADMF 405 and DF II 410 may include X1_2 interface 425, and the interface between ADMF 405 and DF III 415 may include X1_3 interface 430. Similarly, DF II 410 may interface with intercept access point 230 via X2 interface 435, and DF III 415 may interface with intercept access point 230 via X3 interface 440.

Administration Function 405 may be associated with or integral to lawful intercept node 210 or any of the elements contained therein, such as processor 220, receiver 215, delivery function 250, mediation function 460, and transmitter 255. In an embodiment, Administration Function 405 may activate various intercept access points 230, for example over X1_1 interface 420, to filter out or intercept traffic such as a data transmission. In this illustrative embodiment, processor 220 may include ADMF 405, which may communicate with intercept access point 230 via X1_1 interface 420.

Each of Administration Function (ADMF) 405, Delivery Function II (DF II) 410 and Delivery Function III (DF III) 415 may also interface with at least one authorized entity 260. In an illustrative embodiment, ADMF 405 may interface with authorized entity 260 via HI1 interface 445, DF II 410 may interface with authorized entity 260 via HI2 interface 450, and DF III 415 may interface with authorized entity 260 via HI3 interface 455. Each of ADMF 405, DF II 410 and DF III 415, delivery function 250 or other lawful intercept node 210 elements may include or otherwise be associated with at least one mediation function 460. Mediation functions 460 generally convert data on HI1 interface 445, HI2 interface 450 and HI3 interface 455 into a format compatible with authorized entity 260 and national laws, regulatory, or industry requirements.

In embodiments including more than one authorized entity 260, ADMF 405 may act to keep the intercept activities of each individual authorized entity 260 separate. ADMF 405 may be partitioned to ensure appropriate separation of the intercepted transmissions between different authorized entities 260. In situations with more than one authorized entity 260, one authorized entity 260 may not be aware of the existence of another authorized entity 260.

DF II 410 and DF III 415 typically receive intercept related information or content data from intercept access point 230 or any of its associated components via an interface such as X2 interface 435 or X3 interface 440. The received information or content data is then generally forwarded to authorized entity 260. Generally, DF II 410 and DF III 415 may prevent multiple authorized entities 260 from becoming aware of each others' existence. In an illustrative embodiment, DF II 410 may receive and forward Intercept Related Information relating to an intercepted data transmission, and DF III 415 may receive and forward Content of Communication data, i.e. the actual intercepted data transmission.

ADMF 405 generally enables multiple interceptions of data transmissions to be forwarded to a plurality of authorized entities 260, such as different law enforcement agencies. ADMF 405 may act to ensure that only authorized data is intercepted at intercept access point 230. For example, ADMF may be used to ensure separation of content data from different authorized entities 260 in the event different authorized entities 260 are only authorized to receive specific content data. In certain embodiments, broadband networks 235 may have multiple intercept access points 230. In some embodiments, a transmission destined for multiple authorized entities 260 may be intercepted at a single intercept access point 230. In this illustrative embodiment, processor 220, which may include any of ADMF 405, delivery function 250, DF II 410, or DF III 415, in conjunction with transmitter 255 or mediation function 460 distributes the proper intercepted transmission or portion thereof to the proper authorized entity 260 so that each authorized entity 260 receives only the portion of the transmission or associated content data that authorized entity 260 is allowed to receive.

In embodiments where a transmission is intercepted at intercept access point 230, DF II 410 generally distributes Intercept Related Information (IRI) from intercept access point 230 to authorized entity 260 via HI2 interface 450. DF III 410 generally distributes content data such as content data from intercept access point 230 to authorized entity 260 via HI3 interface 455. Intercept Related Information (IRI) may include data related to the date, time, length, or location of the transmission, for example. ADMF 405 may transmit information regarding the actual monitoring or interception, for example the reception of a warrant or the activation of an intercept access point 230, to authorized entity 260 via HI1 interface 445. In various embodiments, ADMF 405 may interwork with other core network 205 elements, such as network management systems, to dedicate sufficient bandwidth within core network 205 or broadband network 235 so that the intercepted data transmission can be backhauled to delivery function 250, which may also include DF II 410 and DF III 415.

Intercept Related Information (IRI) may include the address for delivery of the IRI (generally information identifying the authorized entity such as an authorized entity address), data indicating which subset of information is to be delivered to authorized entity 260, a DF II 410 activation identity that uniquely identifies the activation for DF II 410 and may be used for further interrogation, interception, deactivation, or a warrant reference number. A data transmission may include Intercept Related Information, and Intercept Related Information may be integral to or otherwise associated with the data transmission.

Intercept related information, events, or content data may or may not be directly related to a data transmission such as a phone or video call. This intercept related information may be transmitted to authorized entity 260 at the beginning or end of a transmission session such as a phone call, for any supplementary services during the phone call, as well as data that may not be associated with the call session.

In an embodiment, authorized entity 260 may submit a command to intercept various transmissions. This may be in the form of a warrant. ADMF 405, which may include receiver 215 and processor 220, receives and processes the warrant. The warrant may command that all data transmissions to or from target 245 be intercepted. The criteria in the warrant may be received by receiver 225, which is generally associated with processor 220 which may include administration function 405. At this point the warrant may be considered activated. Intercept access point 230 may be notified of this activation and instructed to locate, within broadband network 235, target 245 or any communications to or from target 245. Continuing with this illustrative embodiment, ADMF 405 may receive input stating that a trigger condition, such as user equipment 240 associated with target 245 transmitting or receiving a data transmission, has been satisfied. Generally, ADMF 405 commands intercept access point 230 to intercept the data transmission in broadband network 235.

Any intercepted data transmissions may then be forwarded, typically from one or more of ADMF 405, DF II 410, or DF III 415 to authorized entity 260 via mediation function 460 and passing through one or more of HI1 Interface 445, HI2 Interface 450, or HI3 Interface 455.

In a typical embodiment, Administration Function (ADMF) 405 receives interception commands such as warrants from law enforcement agencies and forwards commands over X1_1 interface 420 to at least one intercept access point 230 in order to initiate interception. Information about the warrants may be sent from Mediation Function (MF) 460 to authorized entity 260, such as a Law Enforcement Monitoring Facility (LEMF) associated with a Law Enforcement Agency (LEA) over Handover Interface HI1 445, which may include a standardized interface.

In some embodiments, system 400 includes exactly one ADMF 405 in core network 205.

Other embodiments may include any number of ADMFs 405. In various embodiments, ADMF 405 and delivery function 250 (including DF II 410 and DF III 415) may hide from core network 205 and broadband network 235 the location of intercept access points 230. This generally enables multiple interceptions from different authorized entities 260 to intercept data transmissions from the same target 245, (or from the same user equipment 240 associated with target 245). In various embodiments ADMF 405 may be petitioned to ensure separation of the provisioning data from different agencies.

In an illustrative embodiment, at interception, intercept access point 230 sends Intercept Related Information (IRI) to DF II 410 over X2 interface 435. IRI may for example be necessary at the beginning and/or end of a data transmission, for any supplementary services during a data transmission, and for information that is not associated with the data transmission. IRI may include data transmission related events and non data transmission related events. Continuing with this example, Mediation Function 460, which may include or be integral to any elements of lawful intercept node 210, may format Intercept Related Information (IRI) to a requested data format and then transmit the data through Handover Interface HI2 450 to the relevant authorized entity 260.

Similarly, the Content of Communication (CC)—the actual video file or telephone voice data transmission, for example—may be sent from intercept access point 230 to DF III 415 over X3 interface 440. Mediation Function 460 generally formats the intercepted CC to a requested format and sends it through Handover Interface HI3 455 to the relevant authorized entity 260.

In various embodiments, intercept access point 230 functionality is distributed to broadband network 235 where they may intercept broadband data transmissions such as streaming video transmitted to or from users 245 who have been targeted for data interception. These broadband communications may be intercepted at intercept access points 230 and communicated with any combination of centralized ADMF 405, Delivery Function 250, DF II 410, DF III 415, or Mediation Functions 460 using any of X1_1 420, X2 435, X3 440, HI1 445, HI2 450, or HI3 455 Interfaces.

Generally, the amount of bandwidth required for backhauling intercepted data transmissions from intercept access point 230 to delivery function 250 may change drastically, since it is dependent on the data format of the transmission being intercepted. Video conferences, for example, require significantly more bandwidth than a standard audio only telephone call. In an illustrative embodiment, the required bandwidth capacity for backhauling the intercepted data transmission may be reserved in either or both of core network 205 or broadband network 235 before initiating an interception of a data transmission. For example, ADMF 405 or other logic associated with lawful intercept node 210 may enable dynamic reservation of bandwidth in core network 205 or broadband network 235 for backhauling intercepted data transmissions and associated IRI from intercept access point 230 to delivery function 250, DF II 410, or DF III 415. Continuing with this illustrative embodiment, transport resources required for backhauling intercepted data transmissions may be reserved and managed dynamically by interworking functions between ADMF 405 and a management system for core and broadband network elements that host intercept access points 230. For example, when ADMF 405 or other elements associated with lawful intercept node 210 receive an intercept command regarding target 245, such as a warrant, ADMF 405 may communicate with the broadband management system to reserve system resources and then may start the execution of intercept access point 230 functionality on the network element of broadband network 235 to which target 245 is connected. The data transmission to or from target 245 may then be monitored and intercepted based on a set of criteria specified, for example, in the intercept command. In various embodiments, the data transmission may be intercepted, replicated, and sent, for example, over a secure, protected (for example encrypted) interface to delivery function 250 or associated components. Continuing with this example, after passing through mediation function 460, the intercepted data transmission, which may be a replication (i.e., copy) of the data transmission, may be delivered over encrypted, standards-based handover interfaces HI1 445, HI2 450, or HI3 455 to authorized entity 260.

In various embodiments, ADMF 405 may instruct intercept access point 230 to intercept traffic based on certain criteria, such as traffic associated with target 245. Intercept access point 230 may then replicate intercepted traffic and send it to delivery function 250 of lawful intercept node 210. This intercepted traffic may then be forwarded to authorized entity 260 over the HI1 interface 445 for warrant related information, over HI2 interface 450 for Intercept Related Information (IRI), or over HI3 interface 455 for Contents of Communication (CC).

Figure 5:
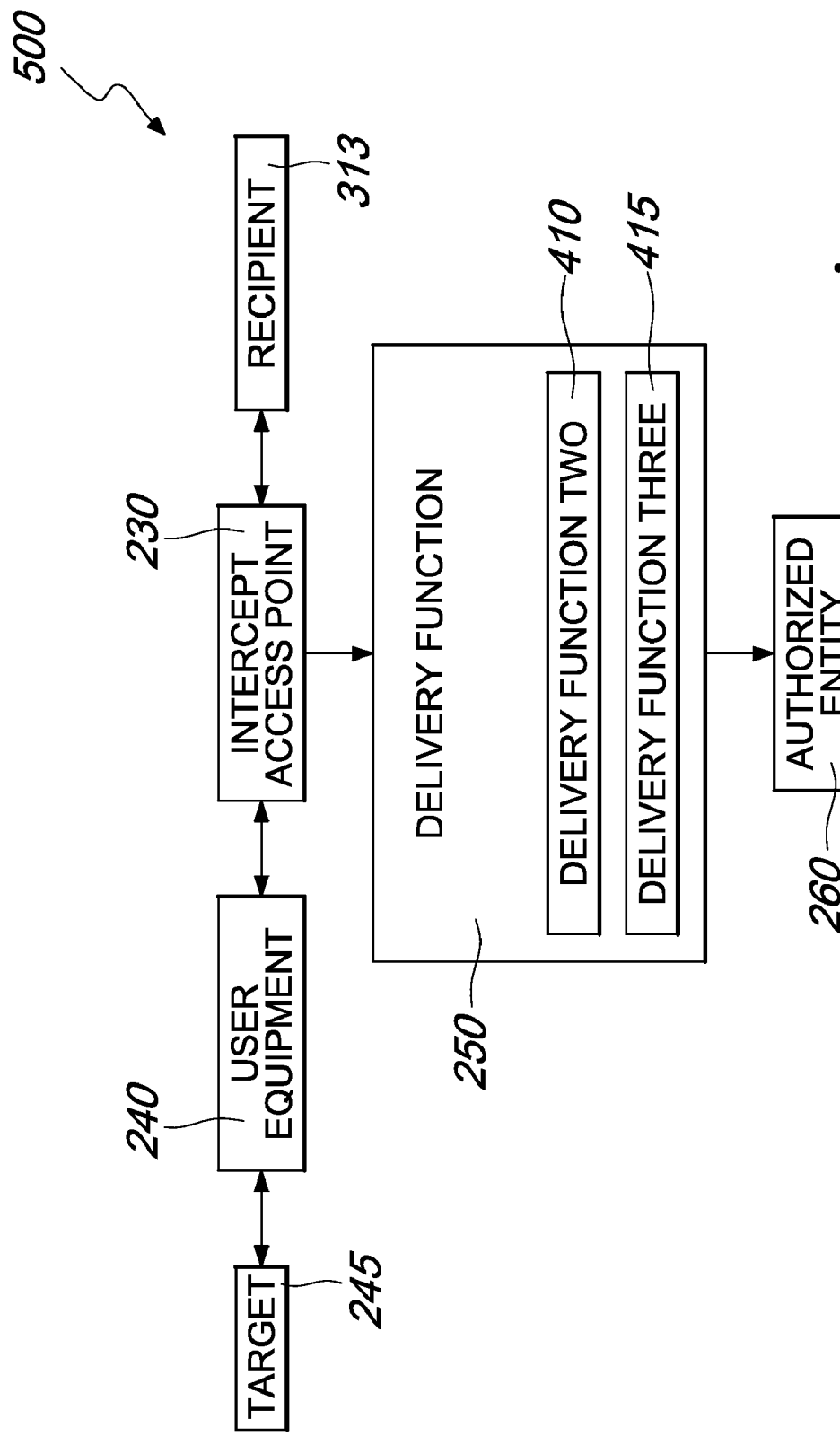
FIG. 5 is a block diagram depicting a system for the transfer of a data transmission to an authorized entity in accordance with an embodiment of the invention.

In brief overview, FIG. 5 is a block diagram depicting a system 500 for the transfer of a data transmission to an authorized entity 260, which may include a law enforcement monitoring facility in accordance with an embodiment of the invention. This may include the transfer of Intercept Related Information as well as Content of Communication. In system 500, intercept access point 230 generally intercepts a data transmission such as a phone call or video conference between target 245 and recipient 313. It is noted that recipient 313 is not necessarily always the party receiving the data transmission. In various embodiments the data transmission may originate from recipient 313 and be intended for target 245. The data transmission may also be bi-directional between target 245 and recipient 313. Typically, the data transmission is intercepted at intercept access point 230 between target 245 and recipient 313. Intercept access point 230 then forwards at least a portion of the intercepted data transmission or intercept related information to delivery function 250, which may include DF II 410 and DF III 415, which then collectively pass the forwarded intercepted data transmission to authorized entity 260. The Contents of Communication (CC) may include the data transmission itself, or a portion thereof. The Interception Related Information (IRI) may include any associated content data, or any associated identification data. In various embodiments, system 500 may function in packet or circuit switching domains.

Figure 6:
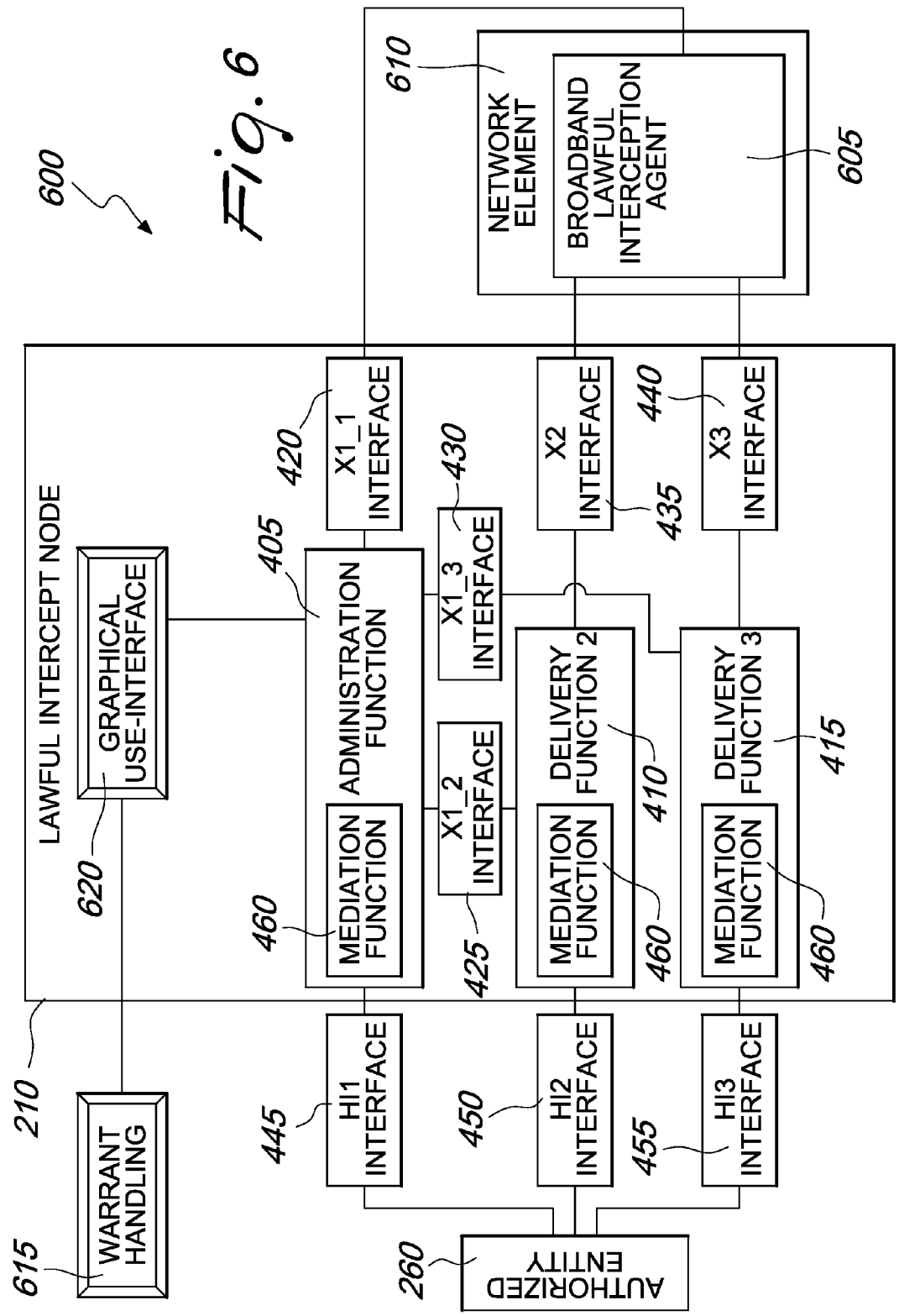
FIG. 6 is a block diagram depicting a system for intercept functionality in a lawful intercept node with intercept access functionality distributed to broadband network elements in accordance with an embodiment of the invention.

In brief overview, FIG. 6 is a block diagram depicting a system 600 for intercept functionality in lawful intercept node 210, including, in an embodiment, ADMF 405, delivery function 250, and mediation function 460, with intercept access functionality distributed to elements of the broadband network 235, such as elements of access networks 305 or metro networks 310, in order to allow interception of all broadband data transmissions, including peer to peer type services. System 600 may include one or more Broadband Lawful Interception (BBLI) Agents 605 in the network elements 610 of broadband network 235, which may be for example access networks 303 or metro networks 310. In various embodiments, BBLI Agents 605 may run on network elements 610, which may include Internet Protocol Digital Subscriber Line Access Multiplexers (IP DSLAMs) or Internet Protocol Multi Service Access Nodes (IP MSANs), such as, for example, those of the Ericsson® Ethernet DSL Access (EDA) family, or Ethernet Transport nodes, such as, for example, those of the Ericsson® OMS2400 family. Typically, BBLI Agents 605 implement intercept access point 230 functionality in broadband network elements 610. In various embodiments, BBLI Agents 605 may run on network elements in broadband network 235.

In an illustrative embodiment, lawful intercept node 210 of system 600 may be enhanced to allow management of a plurality of intercept access points 230, as they may be widely distributed throughout a multiplicity of broadband networks 235. Generally in this illustrative embodiment, BBLI Agents 605 support X1_1 420 interfaces to receive provisioning commands from ADMF 405 in order to initiate or conclude monitoring of target 245 and interception of data transmissions to or from target 245. Further BBLI Agent 605 may filter data transmissions in order to segregate and intercept IRI or CC data from the data transmission. BBLI Agents 605 may also replicate intercepted data transmission and, in some embodiments, transmit IRI events or data over X2 interface 435 and CC data from the replicated intercepted data transmission over X3 interface 440 to lawful intercept node 210 elements, such as, for example, delivery function 250. BBLI Agents 605 may also protect all or portions of a data transmission, including IRI, CC, and provisioning commands regarding target 245 data transmission interception. Generally, interfaces and communication between any lawful intercept node 210 elements and BBLI Agents 605 may be secure, and BBLI Agents 605 themselves may be secured to prevent unauthorized access or tampering.

Furthermore, in some embodiments, BBLI Agents 605 may support deep packet inspection, which generally allows for replication of a subset of the intercepted data transmission. For example, in a network with a limited bandwidth on the links used for transmitting intercepted data transmissions, intercepted traffic replication could, for example, be limited to data packets determined to have the highest priority, such as voice rather than video streaming. In some embodiments, BBLI Agents 605 may buffer intercepted data transmissions, including IRI and CC data on the equipment where BBLI Agents 605 are running. This prevents loss of data in the event of communication problems involving links such as X2 Interface 435 and X3 Interface 440. The size of the buffer may vary depending on system needs and resources.

In some embodiments, BBLI Agents 605 may be capable of running on different equipment platforms. For example, all broadband platforms may include an Application Engine (not shown) with an Applet that includes BBLI Agent 605 as a plug-in on broadband network elements 610 where interception of data transmissions may occur.

Generally, BBLI Agents 605 are functionally located so as to enable interception of all Internet Protocol (IP) based services, including for example video conferencing, data, peer to peer and streaming services, as well as voice over IP communications. In an illustrative embodiment, based on information received from ADMF 405 over X1_1 420 interface, BBLI Agent 605 is typically adapted to intercept specific data transmissions from any target 245, (or from any user equipment 240 associated with target 245). Generally, target identities to identify target 245 may include standards such as for example European Telecommunications Standard Institute (ETSI) or Internet Engineering Task Force (IETF) standards that incorporate one or more of Media Access Code (MAC) addresses, IP source or destination addresses, dial in numbers, or cable modem identities, for example. In an embodiment, lawful intercept node 210 and IP based handover interfaces HI1 445, HI2 450, and HI3 455 are capable of receiving, processing, and forwarding data, video, and streaming services that require more bandwidth than pure voice services in accordance with ETSI standard TS 102 232.

In various embodiments, BBLI Agents 605 may also implement backhauling of intercepted data transmissions from intercept access points 230 to lawful intercept node 210. Generally, the functionality for interworking between lawful intercept node 210 and the management system (not shown) for broadband network elements 610 may enable dynamic reservation of bandwidth for backhauling intercepted data transmissions from intercept access point 230 to delivery function 250.

In embodiments that include a plurality of intercept access points 230 distributed below (i.e., on target 245 side of) the control layer of the core network 205 (i.e. in a scenario in which BBLI Agents 605 may be distributed to the edge of the broadband network 235), bandwidth requirements on lawful intercept node 210 may fluctuate with regards to capacity. In an embodiment, BBLI Agents 605 may be installed and activated on demand only when there is an actual requirement for interception of data transmissions (such as receipt of a command to intercept a data transmission associated with target 245). In other embodiments, BBLI Agents may be installed on any or all broadband network elements 610. Typically, these network elements are managed by a management platform, such as for example the Ericsson® ServiceOn management platform, and in some embodiments this management platform interacts with system 600 elements to, for example, dynamically and efficiently download, install, activate and deactivate BBLI Agents 605 when required. This interaction may involve the use of data encryption and secure interfaces.

In a further illustrative embodiment, this management platform used for managing broadband nodes may interact with interception related elements to control and dynamically allocate core network 205 and broadband network 235 resources. For example, when a command authorizing data interception is received by lawful intercept node 210, this management platform may install BBLI Agents 605 on the relevant network elements, reserve the bandwidth required for sending the intercepted data transmission from BBLI Agents 605 to lawful intercept node 210, and create the necessary connections on core network 205 or broadband network 235 so that a data transmission can be intercepted and transmitted to an authorized entity 260. For example, when ADMF 405 receives an interception command, it may query to determine if there is already an active BBLI Agent 605 located at intercept access point 230 where interception may occur. In embodiments where there is no active BBLI Agent 605 in place, ADMF 405 may send a request to the management platform that manages the broadband network nodes to download and install a BBLI Agent 605 on the appropriate network element. Continuing with this example, this management platform may also reserve sufficient resources on the core network 205 or broadband network 235 elements to fulfill the required operations, and then create secure connections between BBLI Agent 605 and interception related elements. ADMF 405 may then send a command to BBLI Agent 605 to initiate monitoring and interception of target 245. Generally, BBLI Agents 605 implement intercept access point 230 functionality for broadband network elements 610. Therefore, BBLI Agents 605 support X1_1 interface 420, X2 interface 435 and X3 interface 440 toward ADMF 405, DF2 410, and DF3 415 functions, respectively, of lawful intercept node 210. BBLI Agents 605 generally do not directly support either X1_2 interface 425 between ADMF 405 and DF2 410, or X1_3 interface between ADMF 405 and DF3 415, as these two interfaces are typically internal to lawful intercept node 210.

Figure 7:
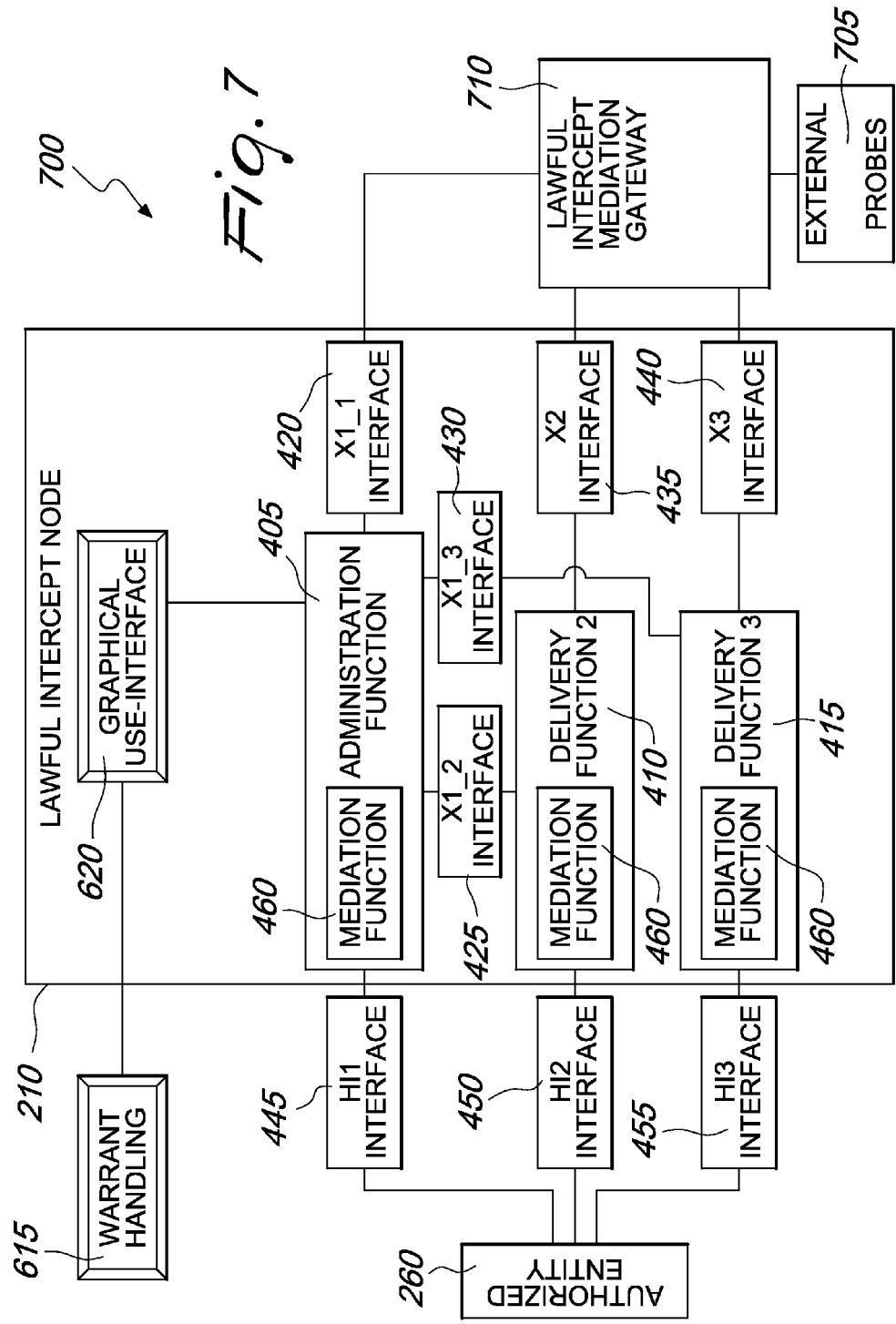
FIG. 7 is a block diagram depicting a system for intercept functionality in a lawful intercept node with external probes in accordance with an embodiment of the invention.

In brief overview, FIG. 7 is a block, diagram depicting a system for intercept functionality in lawful intercept node 210 with external probes in accordance with an embodiment of the invention. In some embodiments, any of X1_1 420, X1_2 425, X1_3 430, X2 435, or X3 440 Interfaces may be internal interfaces, and may be proprietary to a given vendor. In a multi-vendor scenario, external probes 705 such as intercept related logic elements may be used in parts of broadband network 235 or core network 205. To enhance scalability and simplify integration of new probes into the solution, the systems and methods disclosed herein may include a Lawful Interception (LI) Mediation Gateway 710. The LI Mediation Gateway 710 generally aggregates all probes including external probes 705 in any part of broadband network 235 or core network 205 and connects any data associated with these probes, such as intercepted data transmissions, with elements of lawful intercept node 210 such as ADMF 405, delivery function 250, DF II 410, DF III 415, or Mediation Function 460 by using any of X1_1 420, X2 435, or X3 440 Interfaces. This generally allows for single integrated lawful interception systems and methods, compatible with a multi-vendor environment, where distributed intercept access points 230 may, in some embodiments, be connected to a single lawful intercept node 210 that may include ADMF 405, delivery function 250, and mediation function 460, and therefore, in this example all intercept access points 230, including BBLI Agents 605 in network elements 610 and external probes 705 connected to lawful intercept mediation gateway 710, may communicate with a single lawful intercept node 210. Generally, LI Mediation Gateway 710 supports X1_1 interface 420, X2 interface 435 and X3 interface 440 toward ADMF 405, DF2 410, and DF3 415 functions, respectively, of lawful intercept node 210. LI Mediation Gateway 710 generally does not directly support either X1_2 interface 425 between ADMF 405 and DF2 410, or X1_3 interface 430 between ADMF 405 and DF3 415, as these two interfaces are typically internal to lawful intercept node 210.

LI Mediation Gateway 710 generally operates as a generic probe from the point of view of lawful intercept node 210. For example, LI Mediation Gateway 710 terminates X1_1 420, X2 435, and X3 440 Interfaces toward lawful intercept node 210, and generally renders the existence of individual probes, including external probes 705, transparent to lawful intercept node 210. In an embodiment, this is accomplished by converting X1_1 420, X2 435, and X3 440 Interface protocols into different protocols that are available in the probe to be supported, such as for example external probes 705. Generally, LI Mediation Gateway 710 implements the same measures of security and availability as other intercept related components, steps, and elements. Connecting external probes 705 typically has no impact on lawful intercept node 210 or any of its elements. In some embodiments, the only modifications required may include new mappings of the converted X1_1 420, X2 435, and X3 440 Interface protocols in LI Mediation Gateway 710. In general, this results in a single, centralized ADMF 405 for all interception of data transmissions, including data transmissions that remain below the control layer of core network 205. This includes all types of networks, such as fixed, mobile, circuit switched, packet switched, and all types of data transmissions, such as voice, data, video, peer to peer, and streaming, for example, and is applicable in a multi-vendor network with various external probes 705. This results in authorized entities 260 receiving data via one or more of HI1 445, HI2 450, or HI3 455 Interfaces from a single source in a uniform way with no requirement to connect to multiple platforms each with its own individual interfaces for a limited part of a network and a limited selection of services. The systems and methods disclosed herein generally allow interception of any type of data from any type of target in any medium in any type of network.

Generally, the systems and methods disclosed herein include a variety of functions that are implemented in various physical network elements. Core lawful intercept functions, such as ADMF 405, delivery function 250, and mediation function 460, for example, are generally implemented in lawful intercept node 210 located in core network 205. In various embodiments, this type of lawful intercept node 210 may be used for interception in all types of networks, such as fixed, mobile, circuit switched, packet switched, narrowband, or broadband, for example, and are generally dedicated to lawful interception. Lawful intercept node 210 may include graphical user interface 620 and lawful intercept node 210 may also include a number of internal interfaces for communicating to other equipment in the core network 205 and/or broadband network 235, as well as external interfaces for communicating with authorized entity 260 such as one or more law enforcement agencies or monitoring facilities. Internal interfaces, such as X1_1 420, X2 435, or X3 440, for example, may connect lawful intercept node 210 that is located in core network 205 with intercept access points 230 that are located elsewhere in a telecommunications network, such as for example at network elements located in broadband network 235. This location of intercept access points 230 within broadband network 235 may include locations at elements in any of access networks 305 or metro networks 310, for example, or any other network element that is outside core network 205.

Continuing with this illustrative embodiment, intercept access points 230 may be implemented as (i.e. include) BBLI Agents 605 on various network elements residing outside core network 205, or as external probes 705, where external probes 705 may be connected to lawful intercept node 210 through lawful intercept mediation gateway 710. External interfaces HI1 445, HI2 450, and HI3 455 generally interconnect lawful intercept node 210 with authorized entity 260, which may include one or more law enforcement agencies or monitoring facilities.

Note that in FIGS. 1 through 7, the enumerated items are shown as individual elements. In actual implementations of the systems and methods described herein, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD, or both)), non-volatile memory, tape, a system memory, and a computer hard drive capable of causing any network element described herein to take any of the actions described herein.

From the foregoing, it will be appreciated that the systems and methods described herein afford a simple and effective way to intercept data transmissions and forward the intercepted data transmissions to at least one authorized entity 260. The systems and methods according to various embodiments are able to intercept peer to peer type data transmissions that do not pass through centralized core network elements 320 of core network 205. This increases robustness, efficiency, and compatibility, and lowers cost.

Any references to front and back, left and right, top and bottom, and upper and lower are intended for convenience of description, not to limit the present systems and methods or their components to any one positional or spatial orientation.

Any references to elements of the systems and methods herein referred to in the singular may also embrace embodiments including a plurality of these elements, and any references in plural to any element herein may also embrace embodiments including only a single element. References in the singular or plural form are not intended to limit the present systems or methods, or their components, steps, or elements.

Any embodiment disclosed herein may be combined with any other embodiment, and references such as "an embodiment", "some embodiments", "an alternate embodiment", "various embodiments", "illustrative embodiment" or the like are not necessarily mutually exclusive. Any embodiment may be combined with any other embodiment in any manner consistent with the objects, aims, and needs disclosed herein.

Where technical features mentioned in any claim are followed by references signs, the reference signs have been included for the sole purpose of increasing the intelligibility of the claims and accordingly, neither the reference signs nor their absence have any limiting effect on the scope of any claim elements.

One skilled in the art will realize the systems and methods described herein may be embodied in other specific forms without departing from the spirit or essential characteristics thereof. The foregoing embodiments are therefore to be considered in all respects illustrative rather than limiting of the described systems and methods. Scope of the invention is thus indicated by the appended claims, rather than the foregoing description, and all changes that come within the meaning and range of equivalency of the claims are therefore intended to be embraced therein.

The disclosures in Italian Patent Application No. MI2006A001886 from which this application claims priority are incorporated herein by reference.

The invention claimed is:

1. A method for intercepting data transmissions, comprising:
   at a lawful interception node of a core network, receiving a command to intercept a data transmission associated with a target, the data transmission being transmitted through a broadband network;
   at the lawful interception node, identifying the target;
   at the lawful interception node, directing at least one intercept access point to intercept the data transmission, each intercept access point located in the broadband network, the broadband network being an access network or a metro network for wireline broadband;
   at a delivery function that is located in the lawful interception node, receiving at least a portion of an intercepted data transmission; and
   transmitting at least a portion of the intercepted data transmission from the lawful intercept node to at least one authorized entity.

2. The method of claim 1, comprising:
   adapting the lawful intercept node to associate with at least one of an administration function node, a mediation function node, and a delivery function node.

3. The method of claim 1, comprising:
   adapting the lawful intercept node to interface with at least one of a Third Generation Partnership Project compatible network and a European Telecommunications Standard Institute compatible network.

4. The method of claim 1, comprising:
   implementing at least one intercept access point as a broadband lawful intercept agent.

5. The method of claim 1, comprising:
   implementing at least one intercept access point as at least one external probe.

6. The method of claim 5, comprising:
   aggregating the external probes by use of a lawful intercept mediation gateway.

7. The method of claim 1, wherein receiving a command to intercept a data transmission comprises: receiving, by an administration function located in the lawful intercept node, the command to intercept the data transmission.

8. The method of claim 1, comprising:
   dedicating, by an administration function located in the lawful intercept node and associated with the processor, bandwidth for backhauling at least a portion of the intercepted data transmission from the at least one intercept access point to the delivery function.

9. The method of claim 1, wherein identifying the target comprises identifying the presence of the data transmission.

10. The method of claim 9, comprising:
    intercepting, by the at least one intercept access point, the data transmission.

11. The method of claim 9, wherein identifying the presence of the data transmission comprises:
    identifying the data transmission as originating from the target; or
    identifying the target as a recipient of the data transmission.
12. The method of claim 9, comprising:
    identifying the presence of the data transmission based upon at least one of a network address identifier, an Internet protocol source address, an Internet protocol destination address, a media access code address, a dial-in number, or a cable modem identifier.
13. The method of claim 1, comprising:
    identifying the data transmission as a data transmission selected from a group consisting of an audio transmission, a video transmission, a voice over Internet protocol transmissions, a peer to peer transmission, a graphical data transmission, and a streaming transmission.
14. The method of claim 1, comprising:
    intercepting, at one or more of the at least one intercept access points, the data transmission during transmission through said access network or through the metro network.
15. The method of claim 1, comprising:
    replicating at least a portion of the intercepted data transmission.
16. The method of claim 1, comprising:
    backhauling at least a portion of the intercepted data transmission from the at least one intercept access point to the delivery function.
17. A system for intercepting data transmissions, comprising:
    a lawful intercept node of a core network, comprising a receiver associated with a processor for receiving a command to intercept a data transmission associated with a target, the data transmission being transmitted through a broadband network;
    the processor adapted to identify the target;
    the processor directing at least one intercept access point to intercept the data transmission;
    the lawful intercept node further comprising a delivery function associated with the processor, the delivery function receiving at least a portion of an intercepted data transmission; and
    the lawful intercept node further comprising a transmitter transmitting at least a portion of the intercepted data transmission from the lawful intercept node to at least one authorized entity
    characterized in that said at least one intercept access point is located in the broadband network, the broadband network being an access network or a metro network for a wireline broadband.
18. The system of claim 17, comprising:
    the lawful intercept node being adapted to associate with at least one of an administration function node, a mediation function node, and a delivery function node.
19. The system of claim 17, wherein the core network comprises:
    at least one of a Third Generation Partnership Project compatible network or a European Telecommunications Standard Institute compatible network.
20. The system of claim 17, wherein the broadband network comprises:
    at least one of an access network, metro area network, local area network, or wide area network.
21. The system of claim 17, wherein at least one of the receiver or the processor comprises an administration function.
22. The system of claim 17, comprising:
    the processor identifying the data transmission as a data transmission selected from a group consisting of an audio transmission, a video transmission, a voice over Internet protocol transmissions, a peer to peer transmission, a graphical data transmission, and a streaming transmission.
23. The system of claim 17, wherein at least one intercept access point is implemented as a broadband lawful interception agent.
24. The system of claim 17, wherein at least one intercept access point is implemented as at least one external probe.
25. The system of claim 24, wherein at least one lawful intercept mediation gateway aggregates the at least one external probe.
26. The system of claim 17, wherein the lawful intercept node is adapted to receive the intercepted data from each of the plurality of intercept access points.
27. The system of claim 17, wherein the transmitter comprises a mediation function.
28. The system of claim 17, wherein the at least one intercept access point identifies the presence of the data transmission.
29. The system of claim 28, comprising:
    the processor identifying the data transmission as originating from the target; or
    the processor identifying the target as a recipient of the data transmission.
30. The system of claim 28, comprising:
    the processor identifying the presence of the data transmission based upon at least one of a network address identifier, an Internet protocol source address, an Internet protocol destination address, a media access code address, a dial-in number, and a cable modem identifier.
31. The system of claim 28, wherein the at least one intercept access point intercepts the data transmission.
32. The system of claim 31, comprising:
    an administration function located in the lawful intercept node and associated with the processor, the administration function dedicating bandwidth for backhauling at least a portion of the intercepted data transmission from at least one of the intercept access points to the delivery function.
33. The system of claim 31, comprising:
    the at least one intercept access point intercepting the data transmission during transmission through said access network or through said metro network.
34. The system of claim 31, comprising:
    the at least one intercept access point replicating at least a portion of the intercepted data transmission.
35. The system of claim 31, wherein at least a portion of the intercepted data transmission is backhauled from at least one of the intercept access points to the delivery function.
36. The system of claim 31, comprising:
    the receiver receiving at least a portion of the intercepted data transmission transmitted from the at least one intercept access point to a lawful intercept node.
37. A system for intercepting data transmissions, comprising:
    a lawful intercept node of a core network, comprising means for receiving a command to intercept a data transmission associated with a target, the data transmission being transmitted through a broadband network;

the lawful intercept node comprising means for identifying the target;

the lawful intercept node comprising means for directing at least one intercept access point to intercept the data transmission;

the lawful intercept node comprising means for receiving, at a delivery function that is located in a lawful intercept node, at least a portion of an intercepted data transmission; and the lawful intercept node of a core network comprising means for transmitting at least a portion of the intercepted data transmission from the lawful intercept node to at least one authorized entity characterized in that the at least one intercept access point is located in the broadband network, the broadband network being an access network or a metro network for wireline broadband.

38. A non-transitory computer-readable medium comprising computer readable program code embodied therein for intercepting data transmissions, the computer readable program code comprising:

computer readable code for causing a network element to receive, in a lawful intercept node, a command to intercept a data transmission associated with a target, the data transmission being transmitted through a broadband network;

computer readable code for causing a network element to identify a target;

computer readable code for causing a network element to intercept the data transmission at one or more intercept access points, each intercept access point located in the broadband network, the broadband network being an access network or a metro network for wireline broadband;

computer readable code for causing a network element to receive, in the lawful intercept node, at least a portion of an intercepted data transmission; and computer readable code for causing a network element to transmit at least a portion of the intercepted data transmission from the lawful intercept node to at least one authorized entity.

\* \* \* \* \*

UNITED STATES PATENT AND TRADEMARK OFFICE
CERTIFICATE OF CORRECTION

PATENT NO.        : 7,969,968 B2                                    Page 1 of 1
APPLICATION NO.   : 12/444073
DATED             : June 28, 2011
INVENTOR(S)       : De Luca et al.

It is certified that error appears in the above-identified patent and that said Letters Patent is hereby corrected as shown below:

On the title page, item (56), under "OTHER PUBLICATIONS", in Column 2, Line 4, delete "909-20-2"" and insert -- 909-20-1" --, therefor.

In Column 4, Line 44, delete "network," and insert -- network --, therefor.

In Column 17, Line 42, delete "303" and insert -- 305 --, therefor.

In Column 18, Lines 47-50, delete "HI1.....232.", and insert the same at lines 45-46, after "interfaces", as a continuation of the paragraph.

In Column 19, Line 49, delete "block," and insert -- block --, therefor.

Signed and Sealed this
Tenth Day of April, 2012

David J. Kappos
*Director of the United States Patent and Trademark Office*